United States Patent
Hasler

(10) Patent No.: US 6,453,534 B1
(45) Date of Patent: Sep. 24, 2002

(54) METHOD FOR ADJUSTING A TREATMENT MACHINE

(75) Inventor: Uwe Hasler, Hamburg (DE)

(73) Assignee: Sig Simonazzi Germany GmbH, Hamburg (DE)

(*) Notice: Subject to any disclaimer, the term of this patent is extended or adjusted under 35 U.S.C. 154(b) by 0 days.

(21) Appl. No.: 09/434,993

(22) Filed: Nov. 5, 1999

(51) Int. Cl.⁷ .......................... B23Q 17/00; B65G 43/00
(52) U.S. Cl. ................ 29/407.01; 29/407.05; 198/810.04
(58) Field of Search ................... 29/407.1, 407.05, 29/407.08, 407.09; 198/810.04, 813

(56) References Cited

U.S. PATENT DOCUMENTS

| | | | | |
|---|---|---|---|---|
| 3,712,457 A | * | 1/1973 | Pelzer | 198/208 |
| 3,923,151 A | * | 12/1975 | Weber | 198/203 |
| 3,974,716 A | * | 8/1976 | Henkel et al. | 74/661 |
| 5,730,436 A | * | 3/1998 | Viebach et al. | 270/52.16 |

FOREIGN PATENT DOCUMENTS

| | | |
|---|---|---|
| DE | 428 907 | 5/1926 |
| DE | 29 46 951 | 5/1980 |
| DE | 35 02 664 A1 | 7/1986 |
| DE | 38 00 817 C1 | 4/1989 |
| DE | 40 31 209 A1 | 4/1992 |
| DE | 40 32 533 A1 | 4/1992 |
| DE | 35 16 258 C2 | 2/1993 |
| DE | 196 44 092 A | 5/1998 |
| EP | 0 275 562 A2 | 7/1988 |
| EP | 0 388 536 A2 | 9/1990 |

* cited by examiner

Primary Examiner—David P. Bryant
Assistant Examiner—John C. Hong
(74) Attorney, Agent, or Firm—Michael J. Striker

(57) ABSTRACT

A method of adjusting a treatment machine in which a transporting chain for transporting objects to be treated is guided in loops through at least one treatment station in a machine housing and driven at least at two locations by drives which in a normal operation are synchronized and adjusted relative to one another so that the transporting chain in its guides is neither tightly pulled nor compressed, the method has the steps of selecting two drives which follow one another in a forward direction of the transporting chain; asynchronously driving the selected drives, so that a chain portion located therebetween is tightly pulled or compressed by producing a length difference, and measuring a parameter which is dependent from a drive moment of one or both selected drives, when the parameter reaches or exceeds a fixed value, operating the drives asynchronously for reducing the previously produced length difference by a predetermined amount, subsequently maintaining the adjusted relative position of the both drives relative to one another, with asynchronous operation of the drives, and using the preceding steps for further drives, until chain lengths in all chain portions to be adjusted are adjusted.

14 Claims, 1 Drawing Sheet

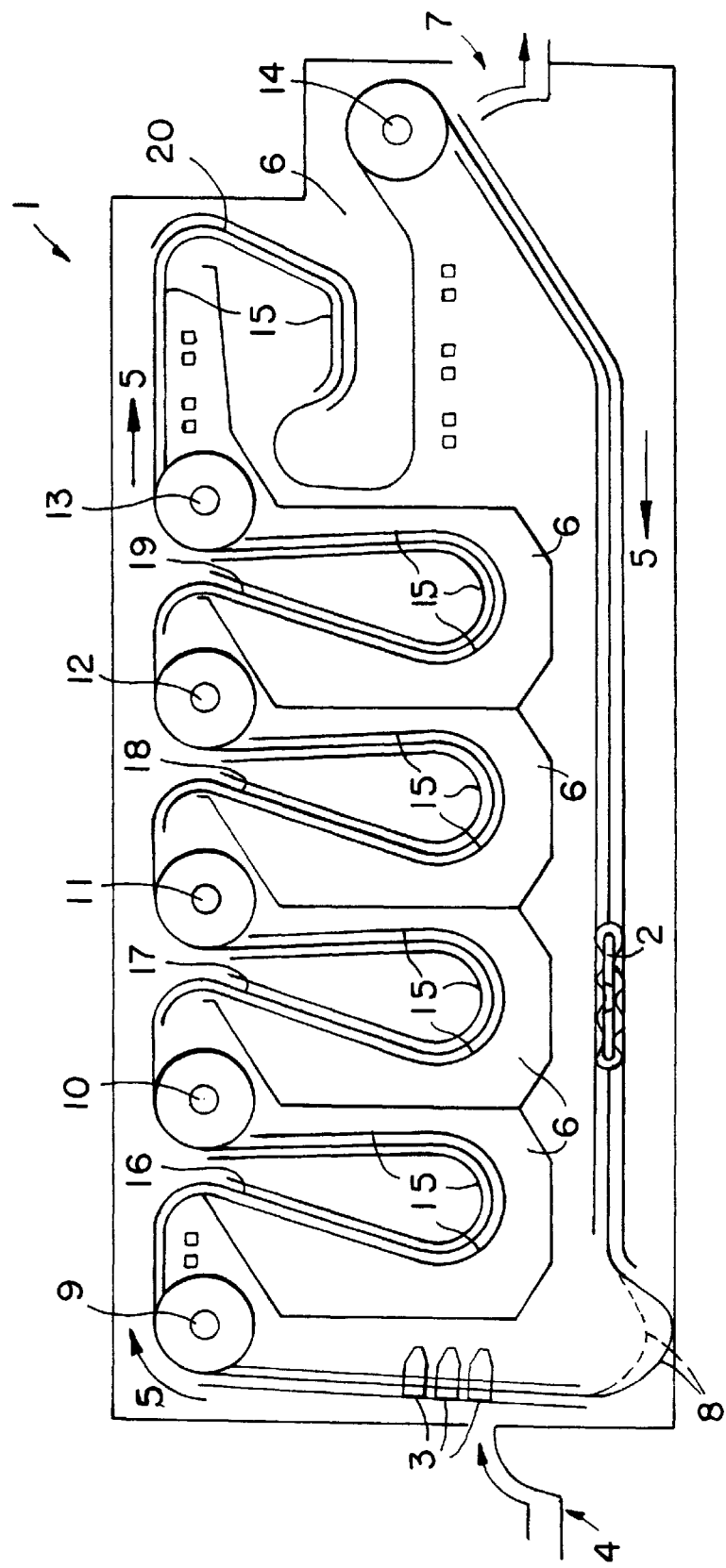

METHOD FOR ADJUSTING A TREATMENT MACHINE

BACKGROUND OF THE INVENTION

The present invention relates to a method for adjusting a treatment machine, in particular a bottle cleaning machine.

More particularly, it relates to a method of adjusting a treatment machine, in which a transporting chain provided for transportation of objects to be treated is guided in loops, in particular meanderingly, through one or several treatment stations in a machine housing and is driven at least at two locations by a drive, so that in a normal operation they are synchronized and adjusted relative to one another, so that the transporting chain in its guides is neither over tightened nor compressed.

Such treatment machines are known in particular as bottle cleaning machines. In such bottle cleaning machines bottles are guided in bottle carriers through the cleaning stations of the machine. The machine has individual holders arranged in a horizontal row for receiving of the bottles, which are mounted with their ends on chain members of the roller chains. The roller chains are guided by guiding rails and folded meanderingly in a vertical plane in the machine housing. In order to maintain friction losses, chain forces and wear within certain limits, the transporting chains of known flat cleaning machines are driven at several locations. This is usually performed by means of horizontal and mutually parallel drive shafts, on which each corresponding chain pair is arranged for engaging in the transporting chain. Typically two-eight drive shafts are provided.

These drive shafts must be driven synchronously, so that the transporting chain is not subjected between two successive drive shafts to significant and usually disadvantageous pressing and pulling forces. Otherwise, the transporting chain and its guiding rails can be damaged or prematurely worn out. The synchronization of the drive shafts can be provided by mechanical means with shafts, transmissions, or chains, or by an electronic synchronous regulation, when several drive motors are provided for each drive shaft or each group of drive shafts.

A chain gap must be adjusted between two drives arranged successively in a pulling direction of the transporting chain so that the transporting chain is guided not to loosely and not too tightly. For adjusting the desired chain gap, the relative rotary position of the successive drive shafts is changed. When the synchronization of the drives is performed by mechanical means, the chain gap can be adjusted by displacement of couplings or chain drives. With electronic synchronization, the angular position of the neighboring drives can be changed by the asynchronous actuation of the individual drives.

In known adjustment processes, the chain tensioning is performed by a person involved in maintenance, by optical observation of the chain length. This approach has basically the disadvantage that for performing of the method a trained person is needed which has a substantial experience in this area. This means that such a method involves high time and labor expenses and also has the risk that the adjustment can be made in erroneous way. Furthermore, for performing of the right chain adjustment, in some cases also the length of the chain inside the cleaning station must be determined. This has the advantage that for this purpose the cleaning fluids must be removed. Since however erroneous adjustments result in a fast wear of the transporting chain, guides and drives, there is therefore a demand for a less expensive adjusting method which is reliable and reproducible at anytime.

SUMMARY OF THE INVENTION

Accordingly, it is an object of the present invention to provide an improved method for adjusting treatment machine, which is substantially automated and can be performed in a simple manner without trained and experienced personnel.

In keeping with these objects and with others which will become apparent hereinafter, one feature of present invention resides, briefly stated, in a method which has the following steps.

a. Two drives which follow one another in a forward direction of the transporting chain are selected;

b. The selected drives are driven asynchronously so that they tightly pull or compress the chain portion located between them by producing a length difference, and a parameter which is dependent from the drive moment of one or both drives is measured;

c. When the parameter reaches or exceeds a fixed value, the drives are driven asynchronously in direction of a reduction of the previously produced length difference by a predetermined amount;

d. The so adjusted relative position of the both drives with respect to one another is subsequently maintained, in particular during the synchronous operation of the drives;

e. The preceding method steps are used for further drives until the chain lengths are adjusted in all portions to be adjusted.

The inventive method has the advantage that it is composed of simple method steps, which are performed in dependence on simple parameters. For its performance, no trained or experienced personnel is needed. It can be performed automatically in a simple manner. The method is simple and reliable since special measuring devices on or in the machine, for example for measurements of the chain tensioning and position are dispensed with.

The predetermined value for the parameter which is dependent from the drive motor is determined so that the corresponding drive moment substantially exceeds a drive moment which is sufficient for tightening of the corresponding chain portion and nevertheless is not so great that a component of the treatment machine, in particular the transporting chain or the drive motor can be unpermissibly loaded. The amount determined for the reduction of the previously produced length difference is selected so that the chain portion to be adjusted sits in its guides not to loosely and not too tightly.

The method is preferably performed outside of the normal operational time, in particular when the treatment machine is maintained at certain times. Basically the method can be performed also during the normal operation, by driving of two drives arranged one after the other in the pulling direction with insignificantly different speeds and forming a parameter which is used for the indication of the tightly pulled or compressed chain portion, for example from the difference between the drive moments of the both drives. During the operation of the treatment machine, the transporting chain, due to wear and pull load, becomes longer after a certain time. Since it is an endless chain, conventionally in a treatment machine a portion is provided for the receipt of the thusly produced excessive chain length. In particular, the transporting chain is suspended so that it more or less sags in form of a loop. It is to be understood that the inventive method is not performed with two drives which are arranged before and after such a compensating portion.

In accordance with another embodiment of the inventive method for a treatment machine with a compensation portion, it is provided that the drive direction of the drive between the chain portion to be adjusted and the compensation portion together with a selected drive and/or all remaining drives together with the other selected drive are operated synchronously. This feature guarantees that for example during a tight pulling of the individual chain portions the neighboring chain portion is not compressed or vice versa. When as provided, all preceding or all subsequent drives are operated synchronously, such a compression in the neighboring chain portions, which can produce an additional counter moment with falsified the measuring results, is prevented with a corresponding advantage. In known treatment machines, as a rule, all chain portions between each two drives are designed differently with respect to their length and the geometric shape of their guides. In this case, it is especially advantageous when for each chain portion to be adjusted, a special parameter which depends on the drive moment is provided, since the optimal chain adjustment must be provided in general in each chain portion with another drive moment.

The same is true for the amount, by which the drive after reaching of a predetermined drive moment must be "adjusted back". In accordance with a further embodiment of the inventive method, it is provided that for each chain portion to be adjusted, a special predetermined amount for the reduction of the previously obtained length difference is provided.

An accurate adjustment of the corresponding chain portion can be also provided when not only the tightly pulled or compressed condition of the chain portion is determined, but also when both conditions are determined. In a variant of the inventive method it is therefore provided that in the frame of the method steps b and c the chain portion to be adjusted is tightly pulled first for obtaining a first parameter value, and then with registration of the chain length which is required for it, is compressed until it reaches a second parameter value, or vice versa, and the amount of the subsequent adjustment step depends on the register chain length. The adjustment step is also not strictly predetermined from the tightly pulled or compressed adjustment, but instead it depends on the length difference of the chain portion between the compressed and the tightly pulled position, or in other words from both positions.

In accordance with a preferable embodiment of the present invention, the drives are controllable electrically, and the method is performed automatically by means of a microprocessor which is programmed in a suitable way. A programmable microprocessor provides nowadays the simplest, multi-facet and cost-favorable possibility for realization of an automatic control. In this case, it is especially advantageous when the drives are provided with rotary sensors for determination of their relative angular positions, the angular positions are stored, and the synchronization is performed from electrical path via the control of the drive. Such an electrical synchronization, requires in particular during the use of a programmable microprocessor, only a small expense without expensive mechanical components.

The inventive method can be performed particularly simple and cost favorable when the drives have electric motors whose current consumption is measured as a drive moment-dependent parameter. In this embodiment, no additional sensors are needed for the measurement of the drive moment. Also, when the invention is described here in connection with the rotatable electric motors, such drives also can include electric linear motors. In this case, the terms rotary angle and drive moment must be replaced with the terms displacement and drive force.

In accordance with a preferable embodiment of the inventive method which is characterized by a particularly simple control process, an electrical drive which is arranged first in a forward direction of the transporting chain after the compensating portion and the chain portion to be adjusted is determined, and the subsequently arranged second electrical drive, are operated synchronously with all subsequent drives in the forward direction, until its current consumption exceeds a predetermined value. Then the second drive together with all subsequent drives are stopped, turned back by a predetermined rotary angle opposite to the forward direction and subsequently fixed, the method is proceeded with the third and all subsequent drives correspondingly until the last chain portion arranged before the compensation portion is adjusted. For the case when the available drive control does not allow return operation of the drive, another method is recommended which also has an especially simple control course. This method starts as the above described method, however after the first stop of the second drive, the first drive is turned by a predetermined rotary angle in the forward direction and subsequently is fixed together with the second drive. The method is proceeded with the third and all subsequent drives correspondingly, until the last chain portion arranged before the compensation portion is adjusted, and before the chain portion to be adjusted and after the arranged drive it is operated correspondingly synchronously or together.

In accordance with a further embodiment of the invention, the inventive method provides in addition to a correct chain adjustment also a value of the chain elongation required for the normal operation of the treatment machine in running, and thereby the connected chain wear.

In accordance with a further method it is provided that the chain length difference occurring in each adjustment is measured and stored, and their sum is evaluated as an indicator for the total chain elongation average and/or the chain wear. It is to be understood that in a treatment machine with a compensating portion for the chain leg also a modified method can be used, in which the length of the chain sagging is measured in the compensating portion and an indicator for the total chain length and/or chain wear is evaluated.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a bottle cleaning machine in accordance with the present invention in a vertical direction.

DESCRIPTION OF PREFERRED EMBODIMENTS

The drawing shows a machine housing 1 in which a closed transporting chain 2 is guided in meandering loops. The transporting chain 2 has a great number of bottle carriers 3 which are arranged in a pulling direction one after the other and in a horizontal direction, or in other words perpendicular to the plan of the drawings in rows one near the other. A bottle feeding device 4 provides in a fast sequence a complete row of the bottle carriers 3 in the forward direction 5 with bottles to be cleaned. The transporting chain 2 transport the bottle carriers 3 with the bottles through different treatment stations 6, where they are rinsed with different fluids and cleaned. The cleaned bottles are removed from the bottle carriers 3 by a bottle discharge device 7. The empty bottle carriers 3 then are moved back, and shortly before the bottle feeding device 4 a compensation portion 8 is provided. During the operation it takes up excessive chain lengths produced by wear and pulling action, in form of a variable chain sagging.

For driving the transporting chain 2, separate drives 9, 10, 11, 12, 13, 14 are provided. They are composed of drive shafts which are driven by a not shown electric motor and have a chain sprocket pair engaging the transporting chain 2. The electric motors are synchronized with one another by a not shown electrical control. The control is performed at best by a programmable small computer. The angular positions of the drives 9–14 are measured by rotary sensors and their relative positions with respect to one another are stored for synchronization of the drives 9–14. With to the synchronous drive it is guaranteed that the transporting chain 2 is not tightly pulled or compressed in its guides 15.

In order to adjust the chain in accordance with the present invention, first two drives are selected. Preferably the selected drives include a first drive 9 which is arranged in the forward direction 5 of the transporting chain after the compensating portion 8 and the first chain portion 16 to be adjusted and a subsequent drive 10 in the forward direction 5. The selected drives 9 and 10 are driven asynchronously. In particular, the first drive 9 is fixed and the second drive 10 is driven in the forward direction 5. Together with the second drive 10, also the subsequent drives 11–14 are driven in the forward direction, so that the transporting chain 2 in the subsequent chain portions 17–20 are neither tightly pulled nor compressed.

When the drive 10 is driven in the forward direction 5, its current consumption is measured as a measure for the used drive moment. By feeding of the transporting chain 2 by the drive 10 with the simultaneously fixed drive 9, a length difference is produced which leads to tight pulling of the chain portion 16 until it fixedly lies on its corresponding guides 15.

When the current consumption of the drive 10 exceeds a predetermined value, all drives 10–14 are stopped and subsequently turned back over a predetermined rotary angle opposite to the forward direction 5, and the rotary angle in the drive 10 is measured.

The predetermined value for the current consumption is naturally determined so that the corresponding drive moment is greater than a drive moment sufficient for tightening of the corresponding chain portion and is smaller than a drive moment which can be damaging for the machine in a corresponding component. The predetermined rotary angle is determined so that the chain portion of the transporting chain 2 to be adjusted sits in its guides 15 neither too loose nor too tight.

Alternatively, with fixed drives 10–14 the drive 10 can be turned over a predetermined rotary angle in the forward direction 5. This second possibility is suitable for example for machines, whose drives can not be operated or can be operated with great difficulties opposite to the forward direction 5.

When now the desired chain length is adjusted in the first chain portion 16, the inventive method provides adjustment of the second chain portion 17, in that on the one hand the drives 9 and 10 and on the other hand the drives 11–14 are synchronously coupled with one another.

First the drives 9 and 10 are stopped and the drives 11–14 are driven together in the forward direction 5, until the chain portion 17 firmly abuts against its drives 15 and until the current consumption of the drive 11 exceeds a predetermined value, which depending on the demand can exceed the value provided for the adjustment of the proceeding chain portions 16 or all subsequent chain portions 18–20.

Now all drives 11–14 are stopped, and subsequently operated over a predetermined rotary value measured at the drive 11, opposite to the forward direction 5. This rotary angle can be also different from the rotary angle provided for the adjustment of the preceding chain portion 16 or all subsequent chain portions 18–20.

As an alternative for turning the drives 11–14 back, it is to be understood that both drives 9 and 10 can be turned together synchronously in the forward direction over the predetermined rotary angle.

After the adjustment of the chain portions 17, in a corresponding continuation of the process the chain portion 18 follows. The drives 9–11 are fixed and the drives 12–14 are driven for tightening of the chain portion 18. The method ends after the adjustment of the last chain portion 20, with the drives 9–13 fixed and the drive 14 is driven alone in the forward direction 5 until the chain portion 20 firmly lies on its guides 15. The last method step is performed after the current consumption of the drive 14 exceeds a predetermined value. The drive 14 is turned back in this case over a predetermined rotary angle, or as alternative, all drives 9–13 are turned together synchronously over a predetermined rotary angle in the forward direction 5.

The excessive chain length which is produced by elongation or wear of the transporting chain 2, is supplied in the inventive process into the compensation portion 8 and contributes there to a greater sagging of the transporting chain 2. The length of the chain sagging can be measured as an indicator for the chain wear, and in the event of exceeding a fixed chain length, a maintenance of the bottle cleaning machine is performed before it can lead to unpredictable and costly failures.

When the bottle cleaning machine is however controlled by a programmable microprocessor, a special measurement of the chain sagging can be dispensed with. In particular, chain length differences occurring during each adjustment can be measured during the adjustment and stored. Their sum can be evaluated as an indicator for the total chain length and thereby the chain wear. This can be provided in particular in that the relative rotary angle of the second drive arranged in a sequence before and after the adjustment of the enclosed chain portion can be determined, and the angle difference calculated and stored.

For example the drives 9 and 10 before the adjustment of the first chain portion are driven always synchronously, so that their both rotary angles are fixedly coupled. During the adjustment of the chain portion 16, this coupling is removed and a relative displacement of the angular positions occurs by an amount which is dependent from the length of the chain portion 16. After the adjustment the both drives 9 and 10 are again coupled synchronously with one another, while however the relative angular position of the drive 9 to the angular position of the drive 10 is changed by an angle difference. The angle difference is stored similarly to the angle differences which occur during the adjustment of the subsequent chain portions 17–20. The sum of all angle differences is then added to the total sum of the angle differences from other method steps. This total sum is a measure for the total chain length and thereby for the chain wear.

The inventive method can be performed completely automatically, in particular, by controlling with a programmable microprocessor, for example outside of the normal operational type of the bottle cleaning machine. Basically, the method can be performed also during the normal operation of the bottle cleaning machine.

In this case, the synchronously running drives 9–14 are subdivided into two synchronously running groups. When for example the chain portion 18 must be adjusted, on the one hand the drives 9–11 and on the other hand the drives 12–14 are driven synchronously with one another. The electrical control increases for example the rotary speed of the drives 12–14 which are coupled with one another and thereby a displacement of the relative rotary angle with respect to the drives 9–11 which are operated being coupled with one another.

The rotary angle difference can be determined in a simple manner in that, a rotary angle which is read by the rotary sensor of the drive 12 is evaluated positively and the rotary angle determined by the rotary sensor of the drive 11 is evaluated negatively. In particular when the rotary angle is provided digitally or as a pulse sequence, the subtraction can be performed in a simple manner. For example an electronic forward/rearward counter which counts the pulses supplied by the rotary sensor of the drive 12 forwardly and counts the pulses supplied by the rotary sensor of the drive 11 rearwardly can be used. The counter content is always composed of a count which is proportional to the rotary angle difference.

With these steps, the chain portion 18 is straightened and fixedly lies on its guides 15. This leads to an increased friction and thereby to an increased current consumption of the drive 12. When now for example the current consumption of the drive 12, the drive 11 or its sum or difference exceeds a predetermined value, the angle difference is stored and thereafter the coupled drives 12–14 are driven with lower speed, until the angle difference for the group of the drives 9–11 is reduced by a predetermined amount. Now the chain length of the chain portion 18 is properly adjusted, and all drives 9–14 are again synchronized with one another. After this, the method can continue with each other chain portion, until it is finished.

It will be understood that each of the elements described above, or two or more together, may also find a useful application in other types of constructions differing from the types described above.

While the invention has been illustrated and described as embodied in method for adjusting a treatment machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of adjusting a treatment machine in which a transporting chain for transporting objects to be treated is guided in vertical loops through at least one treatment station in a machine housing and driven at least at two locations by drives which in a normal operation are synchronized and adjusted relative to one another so that the transporting chain in its guides is neither tightly pulled nor compressed, the method comprising the steps of:

A. Selecting two drives which follow one another in a forward direction of the transporting chain;

B. asynchronously driving the selected drives, so that a chain portion located therebetween is tightly pulled or compressed by producing a length difference, and measuring a parameter which is dependent from a drive moment of one or both selected drives;

C. when the parameter reaches or exceeds a fixed value, operating the drives asynchronously for reducing the previously produced length difference by a predetermined amount;

D. subsequently maintaining an adjusted relative position of the both drives relative to one another, with synchronous operation of the drives;

E. using the preceding steps for further drives, until chain lengths in all chain portions to be adjusted are adjusted.

2. A method as defined in claim 1; and further comprising the step of operating synchronously a drive arranged in a drive direction between a chain portion to be adjusted and a compensating portion of the transporting chain for receiving an excessive chain length, together with a selected drive and/or all remaining drives together with the other selected drive.

3. A method as defined in claim 1, and further comprising providing a parameter which is dependent from the drive moment, for each chain portion to be adjusted.

4. A method as defined in claim 1; and further comprising providing a special predetermined amount for a reduction of the previously produced length difference for each chain portion to be adjusted.

5. A method as defined in claim 1; and further comprising, first pulling tight the chain portion adjusted in the steps b and c until reaching a first parameter, and then with registering the chain lengths which is required for it, compressing the chain portion until reaching a second parameter value or vice versa; and providing an amount of subsequent adjusting steps in dependence on the registered chain length.

6. A method as defined in claim 1; and further comprising electrically controlling the drives; and performing the method automatically by a programmable microprocessor.

7. A method as defined in claim 6; and further comprising providing the drives with rotary sensors for determination of their relative angular positions; storing the angular positions; and forming synchronization of an electrical path by controlling the drives.

8. A method as defined in claim 1; and further comprising providing the drives with electric motors; and measuring current consumption of the electric motors as parameters which are dependent from drive moments.

9. A method as defined in claim 1; and further comprising forming the drives as electrical drives; fixing a first electrical drive arranged in the forward direction of said transporting chain after a compensation portion and before a chain portion to be adjusted; operating a subsequently arranged second electrical drive synchronously with all subsequent electrical drives in the forward direction until its current consumption exceeds a predetermined value; then stopping the second drive together with all subsequent drives, turning them back by predetermined rotary angle opposite to the forward direction, and subsequently stopping; continuing the method with a third and subsequent drives correspondingly until a last chain portion arranged before a compensation portion is adjusted.

10. A method as defined in claim 1; and further comprising forming the drives as electrical drives; fixing a first electrical drive arranged in the forward direction of said transporting chain after a compensation portion and before a chain portion to be adjusted; operating a subsequently arranged second electrical drive in the forward direction until its current consumption exceeds a predetermined value, stopping the second drive together with subsequent drives and turning the first drive by a predetermined rotary angle in the forward direction, and subsequently fixing it together with said second drive; continuing the method with a third and all subsequent drives until a last chain portion arranged before the compensation portion is adjusted; and operating the chain portions adjusted previously and the drives arranged after synchronously or fixing them together.

11. A method as defined in claim 1; and further comprising measuring chain length differences occurring during each adjustment; storing the measured chain length differences; and evaluating their sum as an indicator for a total chain length and/or chain wear.

12. A method as defined in claim 11; and further comprising measuring a length of a chain sagging in a compensation portion and evaluating it as an indicator for a total chain length and/or chain wear.

13. A method as defined in claim 1; and further comprising using a programmable control for performing the adjustment.

14. A method of adjusting a treatment machine in which a transporting chain for transporting objects to be treated is guided in vertical loops through at least one treatment station in a machine housing and driven at least at two locations by drives which in a normal operation are synchronized and adjusted relative to one another so that the transporting chain in its guides is neither tightly pulled nor compressed, the method comprising the steps of:

A. Selecting more than two drives which follow one another in a forward direction of the transporting chain;

B. asynchronously driving the selected drives, so that a chain portion located therebetween is tightly pulled or compressed by producing a length difference, and measuring a parameter which is dependent from a drive moment of one or both selected drives;

C. when the parameter reaches or exceeds a fixed value, operating the drives asynchronously for reducing the previously produced length difference by a predetermined amount;

D. subsequently maintaining an adjusted relative position of the both drives relative to one another, with synchronous operation of the drives;

E. using the preceding steps for further drives, until chain lengths in all chain portions to be adjusted are adjusted.

* * * * *